(12) United States Patent
Visagie et al.

(10) Patent No.: US 8,157,935 B2
(45) Date of Patent: Apr. 17, 2012

(54) AMMONIUM NITRATE GRANULES (75) Inventors: Francois Christiaan Visagie, Vanderbijlpark (ZA); Rainer Ralf Pille, Jukskei Park (ZA)

(73) Assignee: Omnia Fertilizer Limited, Epsom Downs (ZA)

( * ) Notice: Subject to any disclaimer, the term of this patent is extended or adjusted under 35 U.S.C. 154(b) by 291 days.

(21) Appl. No.: 12/376,070

(22) PCT Filed: Aug. 2, 2007

(86) PCT No.: PCT/IB2007/053052
§ 371 (c)(1),
(2), (4) Date: Apr. 22, 2009

(87) PCT Pub. No.: WO2008/015654
PCT Pub. Date: Feb. 7, 2008

(65) Prior Publication Data
US 2009/0301618 A1 Dec. 10, 2009

(30) Foreign Application Priority Data
Aug. 2, 2006 (ZA) .................................. 2006/06406

(51) Int. Cl.
*C06B 47/00* (2006.01)
*C06B 31/00* (2006.01)
*C06B 31/28* (2006.01)
*D03D 23/00* (2006.01)
*D03D 43/00* (2006.01)

(52) U.S. Cl. .............. 149/46; 149/1; 149/45; 149/109.6

(58) Field of Classification Search .................... 149/46, 149/1, 45, 109.6
See application file for complete search history.

(56) References Cited

U.S. PATENT DOCUMENTS

| | | | | |
|---|---|---|---|---|
| 3,589,024 A | * | 6/1971 | Sulcs | 34/337 |
| 4,001,378 A | * | 1/1977 | Jasnosz | 423/268 |
| 4,055,449 A | * | 10/1977 | Wasson | 149/2 |
| 4,619,843 A | * | 10/1986 | Mutsers | 427/213 |
| 5,486,246 A | | 1/1996 | Kelley | |
| 5,675,119 A | * | 10/1997 | Otani et al. | 149/39 |
| 6,022,386 A | * | 2/2000 | Vogel et al. | 23/313 FB |

FOREIGN PATENT DOCUMENTS

| | | |
|---|---|---|
| EP | 0 569 162 A1 | 11/1993 |
| EP | 0 569 163 A1 | 11/1993 |
| EP | 0 850 878 A1 | 7/1998 |
| FR | 1 271 680 | 9/1961 |
| GB | 588054 A | 5/1947 |
| GB | 990487 A | 4/1965 |
| GB | 2 058 732 A | 4/1981 |
| WO | WO-2004/047976 A1 | 6/2004 |

* cited by examiner

*Primary Examiner* — James McDonough
(74) *Attorney, Agent, or Firm* — Birch, Stewart, Kolasch & Birch, LLP (57) ABSTRACT

This invention relates to explosive grade ammonium nitrate porous granules. The granules are produced in a fluidized bed and are formed through a combination of layering and agglomeration to produce ammonium nitrate granules are spherical in shape, smooth, hard and dry and do not break down easily during handling. Ammonium nitrate granules of a specific size range and density can be prepared and the size range and density of the granules can be varied, depending on the application of the granules, and this has particular advantages in preparing granules for use in ANFO explosive compositions.

13 Claims, 9 Drawing Sheets

AMMONIUM NITRATE GRANULES

BACKGROUND OF THE INVENTION

This invention relates to explosive grade ammonium nitrate granules.

It is an object of this invention to provide a method for producing explosives grade nitrate granules and explosives grade ammonium nitrate granules.

SUMMARY OF THE INVENTION

A first aspect of the invention relates to explosive grade ammonium nitrate porous granules, containing 99-100%, typically a minimum of 99.8%, (m/m) ammonium nitrate, produced in a fluidized bed, the granules being formed through a combination of layering and agglomeration.

The explosive grade ammonium nitrate granules are preferably spherical in shape, have a substantially smooth outer surface, and have an average size of 1.5 mm to 3.0 mm.

Preferably, the explosive grade ammonium nitrate granules have a bulk density of 0.75 to 0.9 g/cm$^3$.

Typically, the explosive grade ammonium nitrate granules include microvoids, the microvoids being voids within the granules having a diameter of 10 to 100 microns. These explosive grade ammonium nitrate granules have surface pores ranging from 4 to 8 microns in diameter, through which fuel oil is absorbed.

The explosive grade ammonium nitrate granules may include additives such as granulation aid/s and crystal habit modifier/s.

Typically, the explosive grade ammonium nitrate granules includes (on an active basis) 300-600 ppm, preferably 350-450 ppm, most preferably 450 ppm crystal habit modifier/s; and/or 50 to 300 ppm, preferably 100 to 200 ppm, most preferably 150 ppm granulation aid/s.

The crystal habit modifier/s is/are preferably a salt of alkyl naphthalene sulfonate, preferably the sodium salt.

The granulation aid/s is/are preferably a salt of a straight chain sulfonate, preferably the sodium salt.

The invention also relates to explosive grade ammonium nitrate granules as described above, having an oil absorption of 6% to 15% by weight of a fuel oil.

The invention further relates to an explosive composition, such as an ANFO explosive composition, containing explosive grade ammonium nitrate granules as described above, as well as fuel oil.

A second aspect of the invention relates to a method for producing explosive grade ammonium nitrate granules as described above, the method including:

a) providing an ammonium nitrate melt;
b) supplying the ammonium nitrate melt, via at least one nozzle, to a first fluidised bed which is supplied with air that has preferably been conditioned to a relative humidity of less than 30% at 40° C. and heated to a temperature of 95° C. to 105° C., preferably 100° C. to form ammonium nitrate granules; and
c) passing granules formed in the first fluidised bed preferably directly to a second fluidised bed and cooling the ammonium nitrate granules to a temperature of 60° C. to 80° C., preferably 70° C. or less, in the second fluidised bed.

Typically, the ammonium nitrate granules are formed in the first fluidized bed by spraying an ammonium nitrate melt containing from 92% to 96%, preferably from 93% to 95% by weight concentrate ammonium nitrate into the bed through at least one nozzle.

Granules from the second fluidised bed are typically sent to a sorter from which undersized granules are recycled to the first fluidised bed as seeding particles. Oversized granules from the sorter are first crushed and then also recycled to the first fluidised bed as seeding particles.

Typically, the ammonium nitrate melt contains (on an active basis) 300-600 ppm, preferably 350-450 ppm, most preferably 450 ppm crystal habit modifier/s; and/or 50 to 300 ppm, preferably 100 to 200 ppm, most preferably 150 ppm granulation aid/s.

The crystal habit modifier/s is/are preferably a salt of alkyl naphthalene sulfonate, preferably the sodium salt.

The granulation aid/s is/are preferably a salt of a straight chain sulfonate, preferably the sodium salt.

Figure 2:
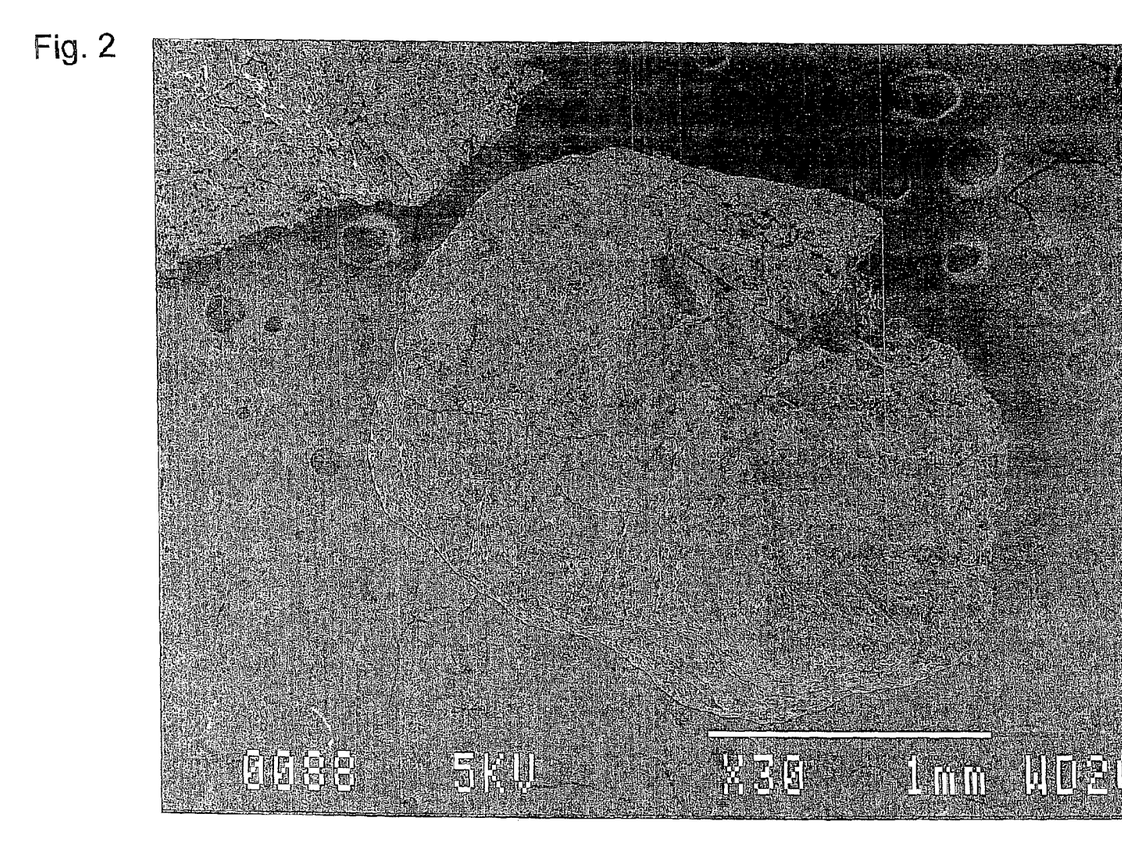
FIG. 2 is an electron microscope photograph of a cross-section through an ammonium nitrate granule produced by the process of this invention.
Figure 4:
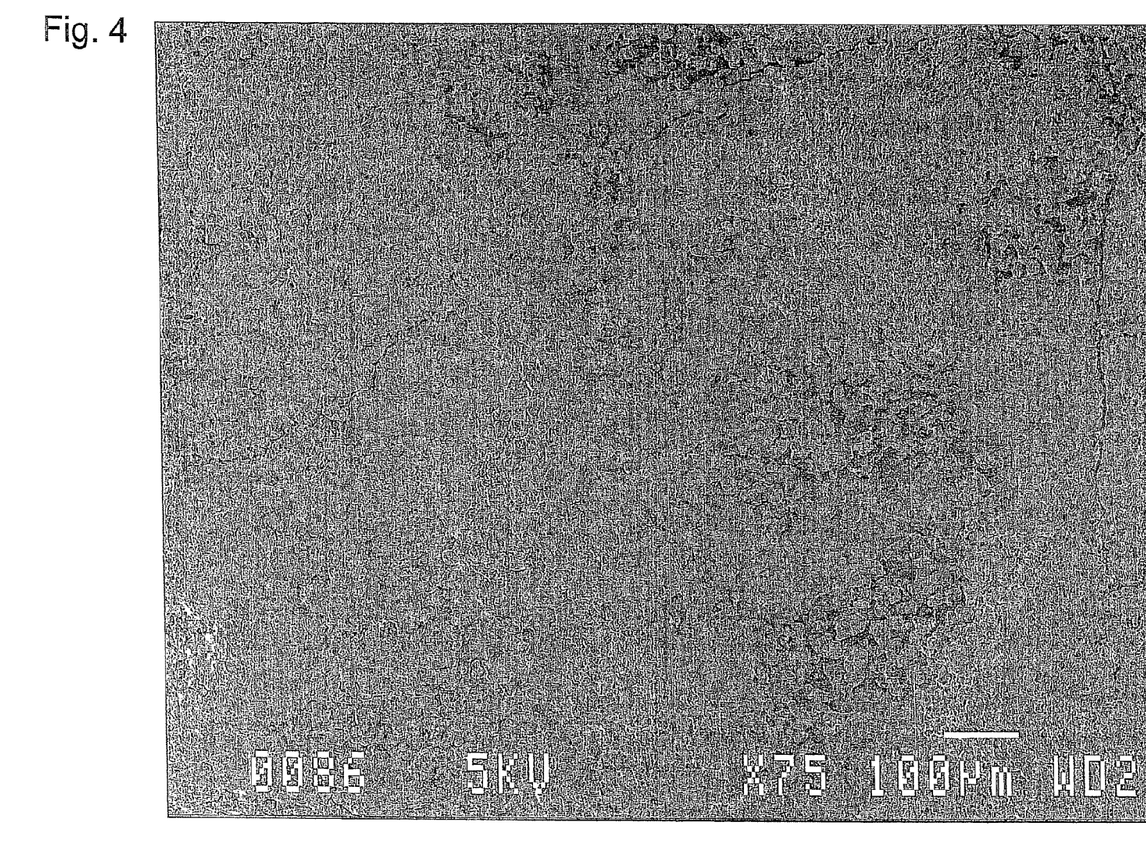
FIG. 4 is an electron microscope photograph of the surface of an ammonium nitrate granule produced by the process of this invention.
Figure 6:
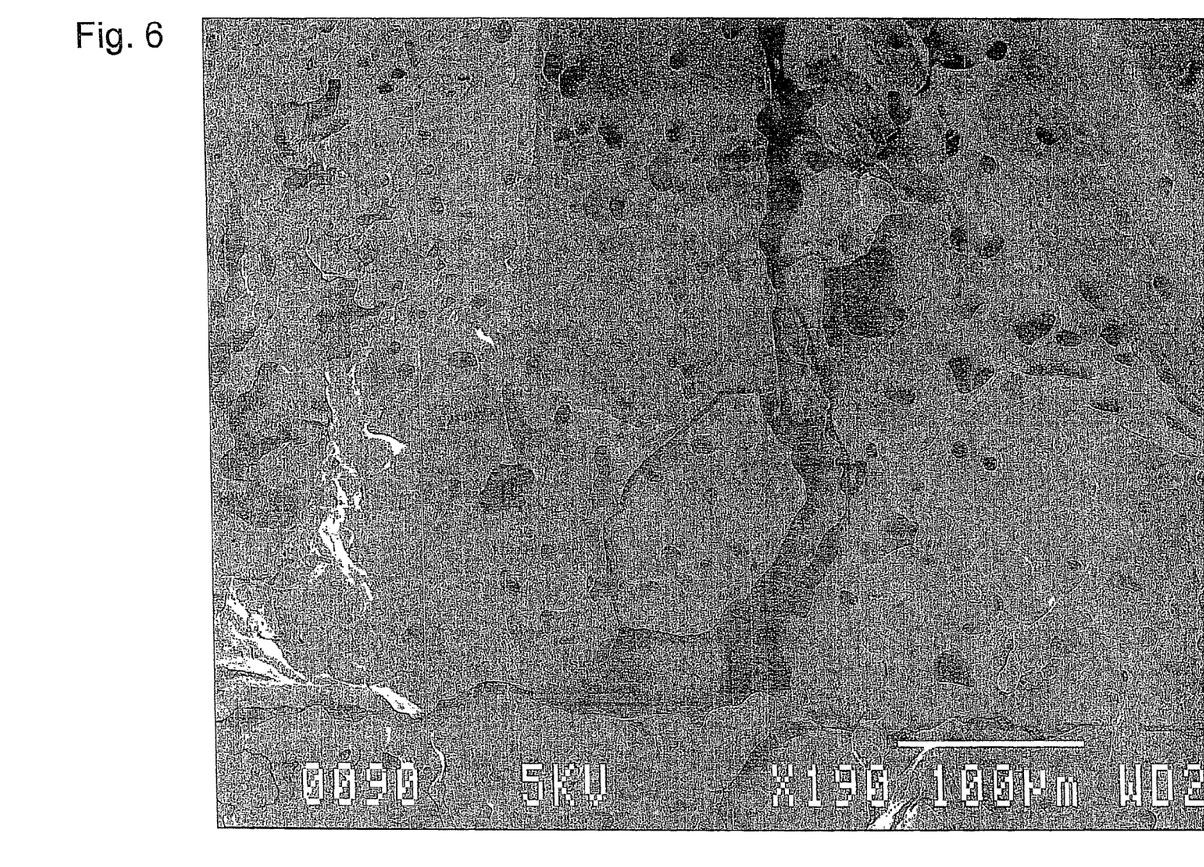
FIG. 6 is an electron microscope photograph of the crystal structure of an ammonium nitrate granule produced by the process of this invention.
Figure 7:
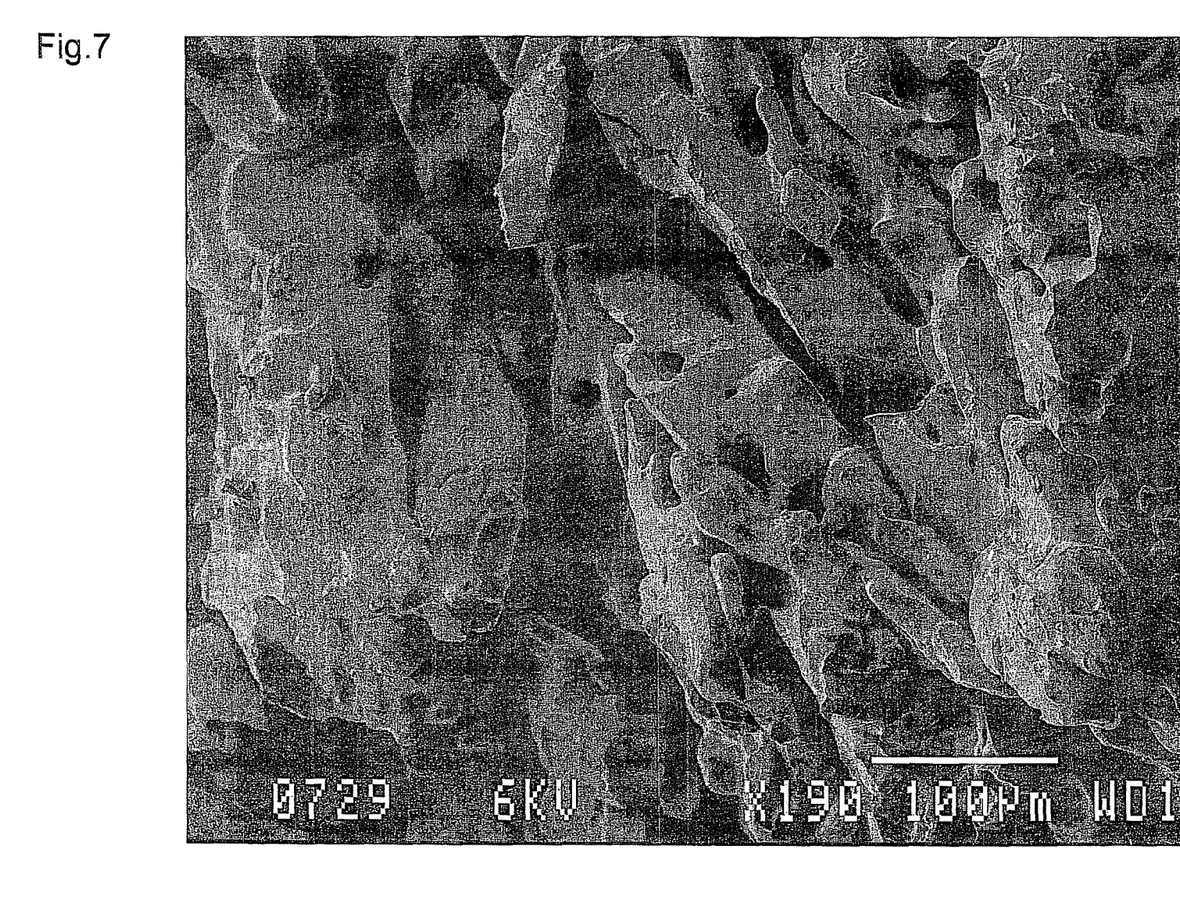
FIG. 7 is an electron microscope photograph of the crystal structure of a prior art ammonium nitrate porous prill.

The invention also relates to an explosive grade ammonium nitrate granule having a cross-section substantially the same as that reflected in FIG. 2; a surface substantially the same as that reflected in FIG. 4; and a crystal structure substantially the same as that reflected in FIG. 6.

A third aspect of the invention relates to a method and apparatus for controlling the height of a fluidised bed in a fluidised bed granulator, the apparatus including a dead zone which is not supplied with fluidised air and which is in direct communication with the fluidised bed, the dead zone including detection means for detecting the height of the fluidised bed and removal means for removing granules from the dead zone; wherein the detection means is in communication with and controls the removal means so that the detection means controls the height of the fluidised bed.

DESCRIPTION OF EMBODIMENTS

Explosives grade ammonium nitrate granules of the invention are produced in an improved apparatus to that described in International Patent Publication No. WO 2004/047976, the content of which is incorporated herein by reference.

Figure 1:
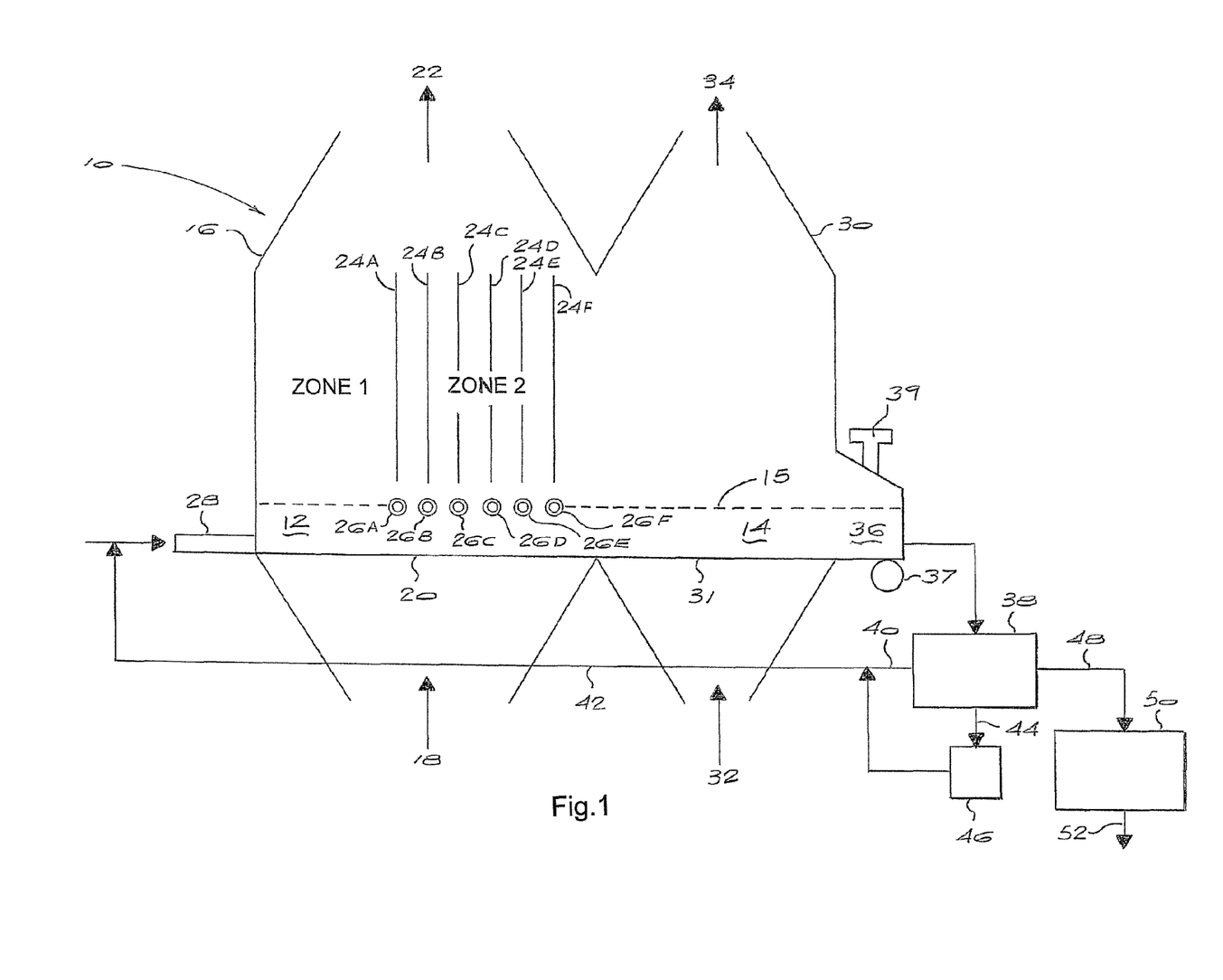
FIG. 1 is a schematic representation of an apparatus and process according to the invention for producing explosives grade ammonium nitrate granules.

With reference to FIG. 1, a granulating apparatus for producing explosives grade ammonium nitrate granules is shown generally by the numeral 10. The apparatus 10 includes first and second fluidised beds 12 and 14 which are in direct communication with one another. "Direct communication" and "directly" means that there is no barrier between the fluidised beds and granules formed in the first fluidised bed 12 flow to the second fluidised bed 14 without the need of a conduit or a conveyor.

The first fluidised bed 12 is located in a granulator 16 defined by a housing. The first fluidised bed 12 is located above a horizontally oriented perforated plate 20. A stream of air 18 is pumped into the bottom of the granulator 16, through the perforated plate 20 into the fluidised bed 12 and extracted at a top exit 22, whereafter the air is passed through a scrubber and released into the atmosphere.

The perforated plate 20 has a surface area of 0.8 $m^2$ to 2 $m^2$, preferably 1 $m^2$ to 1.6 $m^2$, typically about 1.4 $m^2$, and the perforations have a diameter of 1 to 3 mm, typically 1.6 mm. The first fluidised bed 12 is divided into two zones which are shown as Zone 1 and Zone 2. Zone 1 may be from 0.5 m-1 m, typically about 0.7 m in length and Zone 2 may be from 1.4 m-2 m, typically about 1.7 m in length. Zone 1 is a conditioning zone (it does not contain any spray nozzles) and Zone 2, which includes a number of (in this case 6, but there can be more) air atomised nozzles 26A-26F, is a granulation zone. The air atomised nozzles 26A-26F are arranged to deliver an ammonium nitrate melt in a flat spray pattern perpendicular to the flow of air 18 through the perforated plate 20. Each nozzle 26A-26F is provided with a valve (not shown) so that the spray of a nozzle can be switched off when a lower out-put is required. Optionally, Zone 2 may include a number of barriers, in this case six vertically orientated planar baffles 24A-24F. Each baffle 24A-24F is located above a nozzle 26A-26F. The size of each baffle 24A-24F is selected to ensure constant mass flow per cross-sectional area.

A feed screw 28 is provided for feeding seeding particles into the granulator 16.

The second fluidised bed 14 is located in a primary cooler/dryer 30 defined by a housing. The second fluidised bed is located above a horizontally oriented perforated plate 31. The perforated plate 31 has a surface area of 0.4 $m^2$ to 1 $m^2$, preferably 0.6 $m^2$ to 0.9 $m^2$, typically about 0.85 $m^2$. A stream of air 32 is pumped into the bottom of the primary cooler/dryer 30, through the perforated plate 31 and extracted at a top exit 34, whereafter the air is passed through a scrubber and released to the atmosphere.

The upper surface of the fluidised granules in the fluidized beds 12 and 14 is represented by a dashed line, 15. Located adjacent the second fluidized bed 14 and in direct communication with that bed is "dead zone" 36 which is not supplied directly with fluidizing air. A screw 37 is provided for removing ammonium nitrate granules from the dead zone 36. A level-detector 39 is provided for measuring the level of the surface 15 within the dead zone 36. The level-detector 39 (which could be a radar detector) is in communication and controls the screw 37, thereby to maintain the level of the surface 15 at a constant height. A preferred height of the surface 15 within the dead zone 36 is 0.3 to 0.5 m.

Ammonium nitrate granules removed from the apparatus 10 by the screw 37 are sent to a sorter 38. Undersize fine particles 40 from the sorter 38 are recycled via a chute 42 to the feed screw 28 as seeding particles for the first fluidised bed 12. Oversized granules 44 are sent to a crusher 46, crushed, and also recycled via the chute 42 to the feed screw 28 as seeding particles. On-size particles 48 are sent to a secondary cooler 50 where they are cooled to a temperature of approximately 35° C. and then sent for packaging 52.

In an embodiment of the invention for producing explosives grade ammonium nitrate granules, ambient air is drawn into a condenser and conditioned to remove the moisture from the air. The conditioned air preferably has a relative humidity of less than 30% at 40° C. The conditioned air is then passed through a steam-heater which heats the air to a temperature of 95° C. to 105° C., typically 100° C. The conditioned heated air 18 is then pumped into the granulator 16 to form the first fluidised bed 12. In a preferred embodiment, the conditioned heated air 18 is at a temperature of 100° C. and has a relative humidity of less than 10%.

A concentrated liquid ammonium nitrate melt having a concentration of from 92% to 96% (m/m), typically from 93% to 95% (m/m) is pumped into the granulator 16 through the nozzles 26.

The ammonium nitrate melt preferably includes a granulation aid and a crystal habit modifier. The crystal habit modifier is typically a salt of naphthalene sulfonate, preferably the sodium salt. The crystal habit modifier may be added at 300-600 ppm (on active basis), preferably 350-450 ppm, typically 400 ppm. The granulation aid is typically a salt of a straight chain sulfonate, preferably the sodium salt. The granulation aid is may be added at 50-300 ppm, preferably 100-200 ppm, preferably 150 ppm. Each of the aforementioned additives imparts porosity properties to the granules, but for optimum results both are used. The ammonium nitrate melt may also include an anti-foaming agent such as precipitated silica.

Typically, a liquid ammonium nitrate solution is passed into adjustment tanks, where 1 kg of granulation aid and 30 L of crystal habit modifier are added per 15 ton solution. These additives impart porosity and strength characteristics to the ammonium nitrate granules. The ammonium nitrate is concentrated to between 92 to 96% (m/m) with 4 to 8% free moisture content. Utilizing a pump at 3.5 to 4.5 bar pressure, the concentrated ammonium nitrate is then injected into the first fluidised bed 12 of the granulator 16 via spray nozzles 26 at a temperature between 130 and 160° C. In addition to pressurisation by the pump, compressed air at a pressure of 5 to 6.5 bar assists with the atomising of the Ammonium Nitrate melt nozzle 26. The compressed air is heated to a temperature from 90 to 110° C. The heated compressed air retards the crystallisation of the melt, which promotes layering of the granules and enhances the formation of the preferred smooth, spherical granules of the invention.

Ammonium nitrate seeding particles that have a size of approximately 0.5 mm to 1.0 mm are fed into the granulator 16 by the feed screw 28. The seeding particles pass through zone 1 of the first fluidised bed 12 where they are preconditioned, i.e heated by the air 18 and also dried. This preconditioning step ensures optimal layering on the seed to ensure hardness, smoothness and sphericity of the granules when entering Zone 2 of the first fluidised bed 12. Liquid ammonium nitrate sprayed from nozzles 26 is deposited onto the ammonium nitrate seeding particles to form granules of ammonium nitrate. The granules of ammonium nitrate are hygroscopic. The conditioning of air 18, which preferably has a relative humidity of less than 10% at 100° C., is important. If the air 18 was not conditioned, the granules may absorb moisture from the air, become sticky, and agglomerate. In Zone 2, atomised droplets of melt spray impact with particles in the fluidised bed and form a layer on the particles, thus causing uniform growth in size. The configuration of the baffles 24A-24F can optimise contact between droplets and particles and prevent back flow, which reduces over granulation and oversized particles.

Granules of ammonium nitrate formed in the first fluidised bed 12 flows directly into the second adjacent fluidised bed 14 of the primary cooler/dryer 30. The primary cooler/dryer 30 cools the granules down to below 70° C., typically between 60 and 80° C. with conditioned air 32.

Although the particles are generally cooled to between 50 and 70° C., it is possible to cool the particles to a temperature above 40° C. because, in the present configuration of the apparatus 10, cool seeding particles return to the feeder 28 and may be heated to the required temperature in the preconditioning Zone 1. The primary cooler/dryer 30 also makes it possible to increase the production capacity of the granulator 16, as the flow rate of hot melt at 130 to 160° C. into the granulator 16 can be increased. Porosity of the ammonium nitrate granule is created in the granulator 16, as is the major portion of the drying of the granules. As water is forced out during the layering process, pores are formed. The moisture content of the ammonium nitrate granules may be further reduced to below 0.3% in the primary cooler/dryer 30.

A screw 36 removes ammonium nitrate granules from the primary cooler/dryer 30. The granules removed by the screw 36 are sorted in the sorter 38 and fine particles are recycled to the feed screw 28 as seeding particles. Oversized granules are crushed in the crusher 46 and also recycled to the feed screw 28. On-size granules (40-80% from 1.5 mm to 3.0 mm) are sent from the sorter 38 to the secondary cooler 50 for cooling and then packaging.

The ammonium nitrate granules produced by the apparatus and process of the invention are of explosive grade, spherical in shape, smooth, hard and dry and do not break down easily during handling. Typically, the granules have an average granule hardness of 1 kg to 3 kg, the average being determined by evaluating 10 granules by the following method: hardness is determined by applying a force measured in kg onto a single granule in the size range 1.5-3.0 mm, with the hardness result being the force in kilograms that results in the fracture of the granule, i.e. the yield point. The granules have a low moisture content typically less than 0.3% but preferably less than 0.2%. The granules further have a smooth surface, which imparts favorable flow characteristics.

A particular advantage of the explosive grade ammonium nitrate granules of the invention is that because the granules are formed through a combination of layering and agglomeration it is possible to vary the granule size depending on the requirement or application. Each granule includes microvoids having a diameter from 10 to 100 microns. The microvoids in the different layers of the granule are not necessarily directly connected. As a result, microvoids on the surface of the granule are not necessarily directly connected to the microvoids at the core of the granule. This affects the behaviour of these granules in use in ANFO explosive compositions, when they are combined with fuel in the form of an oil. When exposed to oil, the granules absorb from 6% to 15% by mass fuel oil, which is able to penetrate up to the core.

A further advantage of this invention is that explosive grade ammonium nitrate granules of a specific size range and density can be prepared and the size range and density of the granules can be varied, depending on the application of the granules.

The explosives grade ammonium nitrate granules of the invention have a particular application in an ANFO explosive composition. A typical ANFO composition comprises of 94% Ammonium Nitrate (prill or granule) and 6% fuel oil. ANFO is prepared in a mixing process where fuel oil is sprayed onto the prill or granule at a prescribed feed rate that would provide the desired oxidizer to fuel ratio. The two phases are mixed together and adequate retention time allows for fuel absorption. The porosity of the Ammonium Nitrate prill or granule would allow absorption of the fuel oil, providing an intimate mixture of oxidizer to fuel.

Tests have shown that an ANFO composition comprising ammonium nitrate granules of the present invention can result in higher or, if desired, lower velocity of detonation (VOD) (depending on what is required) than an ANFO composition using porous prill ammonium nitrate, depending on specific operating conditions for manufacturing of the ammonium nitrate granules.

ANFO made with ammonium nitrate granules of the present invention was tested in steel pipes for VOD's. The ANFO produced using the ammonium nitrate granules demonstrated 6D detonator sensitivity. The product prepared with ammonium nitrate granules of the present invention detonated reliably and compared very well with conventional ANFO using porous prill ammonium nitrate. In one example, granular ammonium nitrate with a hardness of 0.96 kg (where the charge density was 8% higher than conventional ANFO using porous prill ammonium nitrate), the VOD's were, on average, 20.0% higher. The results of the tests are shown in Table 1 below:

TABLE 1

| Product | AVERAGE VOD (m/sec) |
| --- | --- |
| ANFO using porous prill ammonium nitrate | 3169 |
| ANFO using ammonium nitrate granules of the invention (Hardness = 0.96 kg) | 3800 |

In a further example, granular ammonium nitrate with a hardness of 1.84 kg, the VOD was, on average, 13.6% lower than conventional ANFO using porous prill ammonium nitrate. The result of the tests are shown in Table 2 below:

TABLE 2

| Product | AVERAGE VOD (m/sec) |
| --- | --- |
| ANFO using porous prill ammonium nitrate | 3169 |
| ANFO using ammonium nitrate granules of the invention (Hardness = 1.84 kg) | 2737 |

Physical characteristics of ammonium nitrate granules prepared by the process of the present invention can be compared to prior art porous prills with reference to FIGS. 2-7:

Cross-Section

Figure 3:
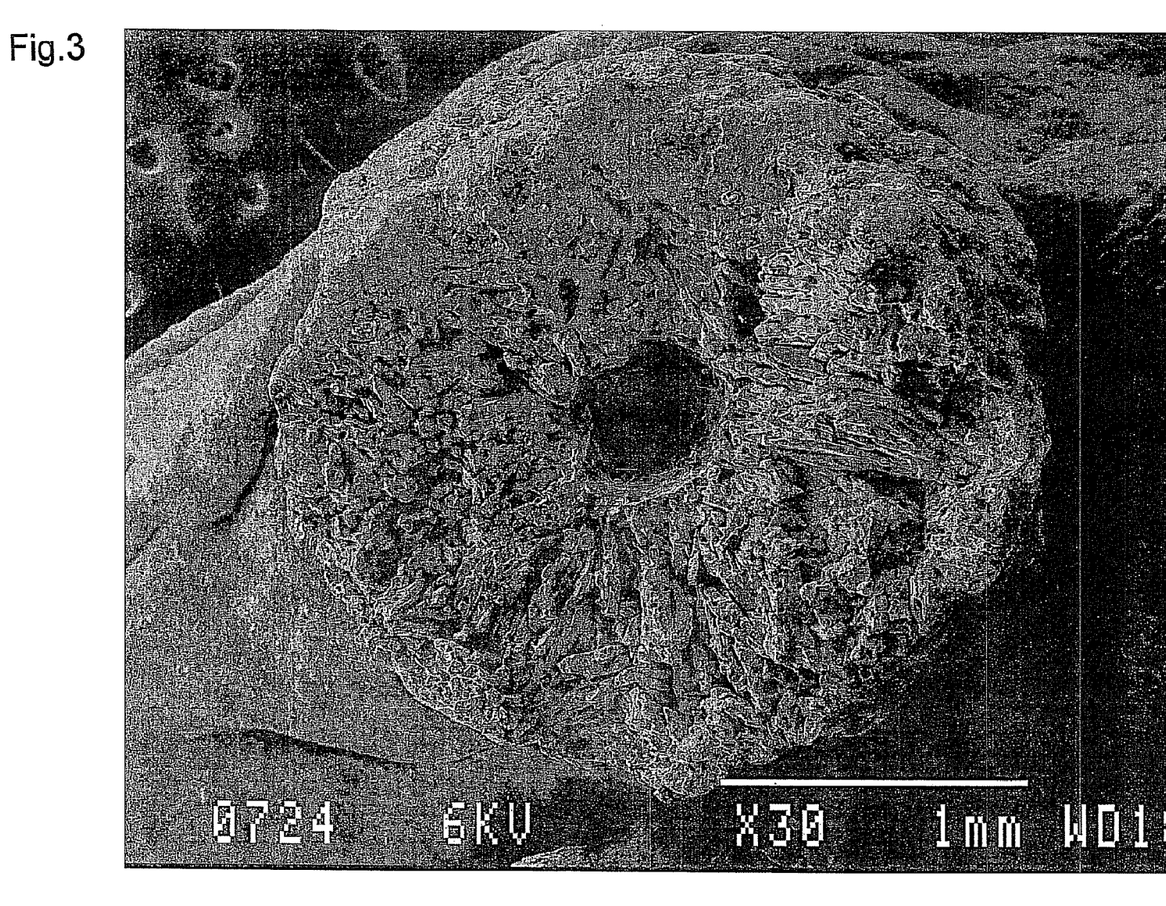
FIG. 3 is an electron microscope photograph of a cross-section through a prior art ammonium nitrate porous prill.

From 7 FIGS. 2 and 3 it can be seen that the prill of FIG. 3 has a characteristic central hole, whereas this hole is absent from the granule of FIG. 2. The prill also has many crevasses and cracks with sharp edges which is also evident in FIG. 7, whereas the voids in the granule have smoother edges, as can also be seen in FIG. 6.

Outer Surface

Figure 5:
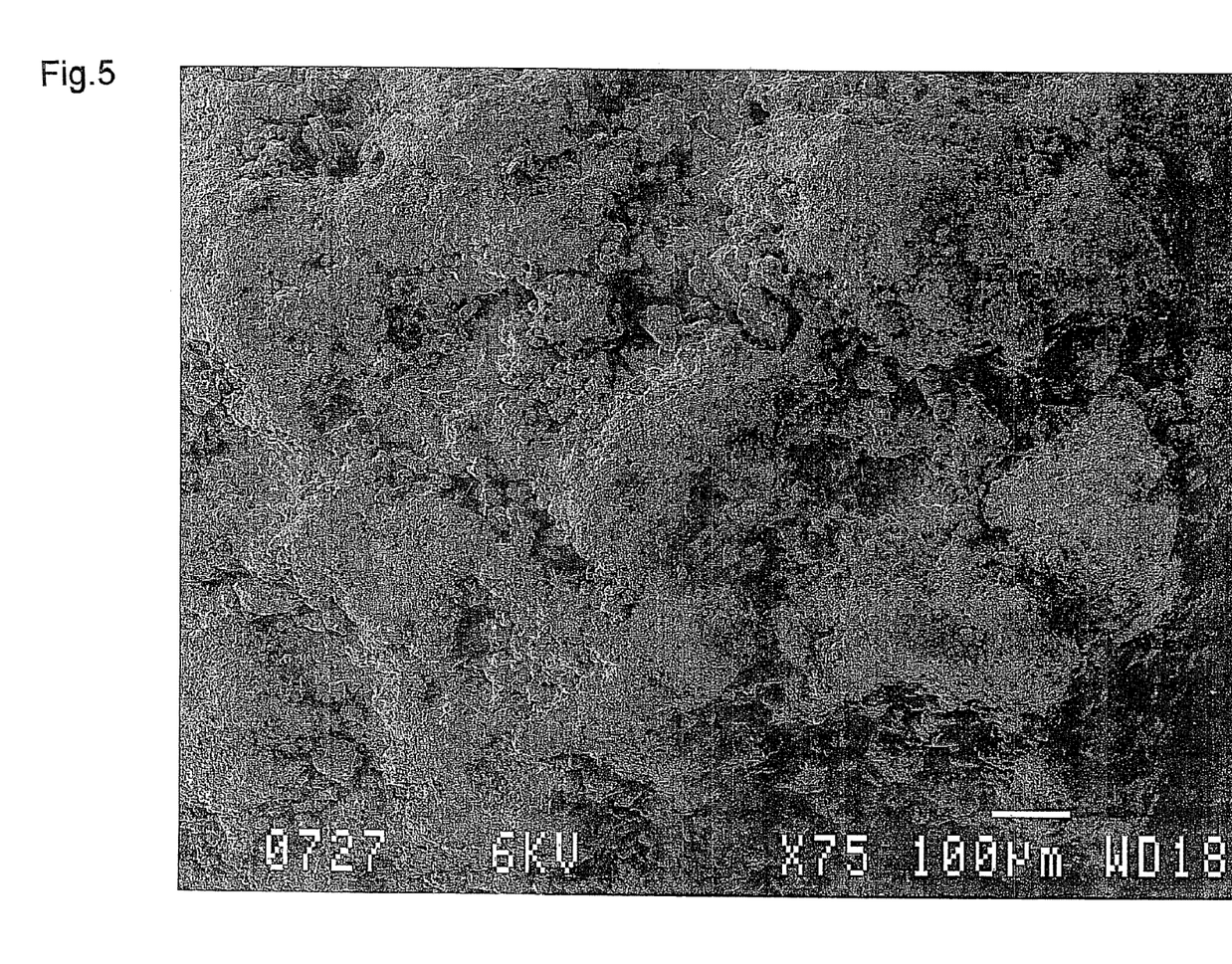
FIG. 5 is an electron microscope photograph of the surface of a prior art ammonium nitrate porous prill.

With reference to FIGS. 4 and 5, the granule has a much smoother outer surface than the prill. An advantage of this is that the granules are more free-flowing than the prills and have less chance of caking.

Figure 8:
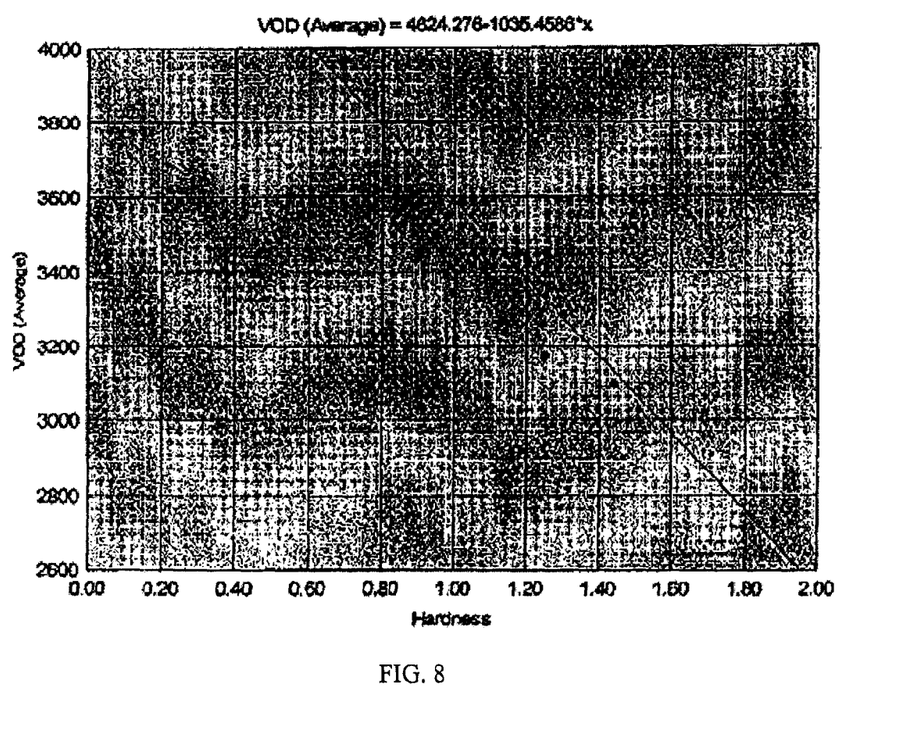
FIG. 8 shows the velocity of detonation (VOD) increases with decreasing hardness.
Figure 9:
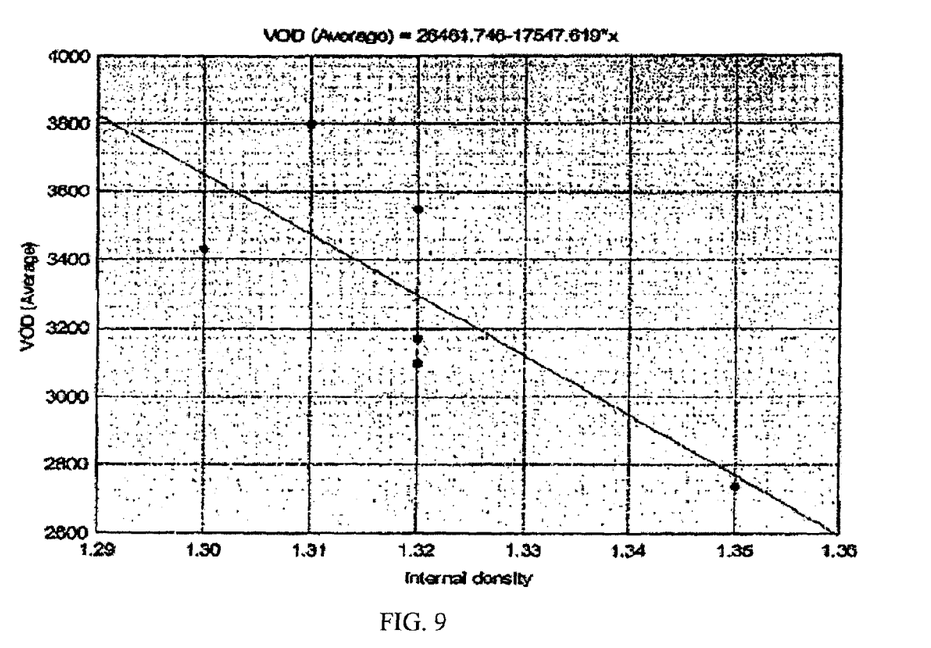
FIG. 9 shows the optimum internal density of the granules for velocity of detonation (VOD is from 1.30 to 1.32.

Finally, tests were carried out on ammonium nitrate granules produced by the process of the invention to ascertain the effect of hardness and internal density of the granules on VOD (velocity of detonation). These results are provided in FIGS. 8 and 9. Interestingly, from FIG. 8 it is apparent the VOD increases with decreasing hardness. This can be explained as follows: as the softer granules are blow loaded, the granules break down which increases charge density. This leads to an increase in VOD. From FIG. 9 it is apparent that the optimum internal density for VOD is from 1.30 to 1.32.

The invention will now be described in more detail with reference to the following non-limiting example:

Example

A batch process was used to produce pure porous granular ammonium nitrate containing 99.8% (m/m) ammonium nitrate. The ammonium nitrate solution was obtained from an Ammonium Nitrate plant in concentrations between 88% and 90%. Each batch was made of 15 t of ammonium nitrate solution, 1 kg crystal habit modifier (in this case sodium salt of alkyl naphthalene sulfonate available from Lake International Technologies (agents for Arrmaz Custom Chemicals) under the trade name Galoryl™), and 30 L of granulation aid (in this case the sodium salt of a straight chain sulfonate available from Cheminmark (Pty) Ltd (agents for Kao Corporation S.A.), under the trade name SK Fert™).

This solution was then concentrated at atmospheric pressure by evaporating water. This was accomplished by passing steam (8-10 bar) through coils in a concentrator tank. With a reference to the figure, the second solution at a concentration of over 95%, with a temperature of 150-160° C. was pumped into the granulator 16 of the apparatus 10 through four nozzles 26 at a rate of 2 t/hr. The granulator 16 housed a first fluidised bed 12 having a total fluidising surface area 20 of 1 m2 with 8% apertures of 1.5 mm diameter holes. The air 18 supplied to this fluidised bed had a temperature of 98° C. and a relative humidity of less than 15%.

The ammonium nitrate granules from the granulator 16 flowed directly to the primary cooler/dryer 30, which housed a second fluidised bed 14 having a total fluidising surface area of 0.65 m2. This second fluidised bed also had the same apertures as the first fluidised bed. Conditioned air 32 supplied to the second fluidised bed was at a temperature of 30° C. and had relative humidity of 25% at 30° C.

Granules from the primary cooler drier 30, with particle sizes ranging from <0.5 mm to 10 mm, were then sent to the sorter. The granules were sorted using a double deck screen with apertures sized between 1.5 mm and 3 mm. Undersized particles are recycled to the first fluidised bed and oversized particles are crushed to a size of below 3.0 mm and also returned to the first fluidising bed as seeding material. The final product was passed into the secondary cooler with a total fluidising surface of 0.6 m2 and the same aperture size as the other fluidising beds. The final product leaving the secondary cooler had a temperature of 46° C. The final product was bagged directly into 1-ton (1000 kg) bags. These bags were transported to a coating unit, where they are opened and fed into coating drum. The granules are coated with 0.15% anti-caking agent. The final product composition utilising the above specific conditions was:

| | |
|---|---|
| Nitrogen | 34.5% (m/m) |
| Moisture | 0.24% (m/m) |
| pH | 4.6 |
| Hardness | 1.31 kg |

Typical final product composition is:

| | |
|---|---|
| Nitrogen | 34.5-35% |
| Moisture | <0.3% (m/m) |
| pH | 4-6 |
| Hardness | 1-3 kg. |

The invention claimed is:

1. A method for producing explosive grade ammonium nitrate granules, suitable in an Ammonium Nitrate and Fuel Oil (ANFO) explosive composition, wherein the granules have microvoids which have a diameter of 10 to 100 microns and an oil absorption of 6 to 15% of fuel oil, the method including:
   a) providing an ammonium nitrate melt containing 93% to 95% by weight concentrate ammonium nitrate and 300 to 600 ppm of a salt of an alkyl naphthalene sulfonate crystal habit modifier on an active basis; and
   b) spraying the ammonium nitrate melt, through at least one nozzle, into a first fluidised bed which is supplied with air that has been conditioned to a relative humidity of less than 30% at 40° C. and heated to a temperature of 95° C. to 105° C. to form ammonium nitrate granules.

2. The method according to claim 1 further comprising:
   passing granules formed in the first fluidised bed to a second fluidised bed and cooling the ammonium nitrate granules to a temperature of 60° C. to 80° C. in the second fluidised bed.

3. The method according to claim 2, wherein granules from the second fluidised bed are sent to a sorter from which undersized granules are recycled to the first fluidised bed as seeding particles.

4. The method according to claim 3, wherein oversized granules from the sorter are first crushed and then also recycled to the first fluidised bed as seeding particles.

5. The method according to claim 1, wherein the ammonium nitrate melt contains 350 to 450 ppm of the salt of alkyl naphthalene sulfonate.

6. The method according to claim 5, wherein the ammonium nitrate melt contains 400 ppm of the salt of alkyl naphthalene sulfonate.

7. The method according to claim 1, wherein the salt of alkyl naphthalene sulfonate is a sodium salt.

8. The method according to claim 1, wherein the ammonium nitrate melt contains a granulation aid/s.

9. The method according to claim 8, ammonium nitrate melt contains (on active basis) 50 to 300 ppm granulation aid/s.

10. The method according to claim 9, wherein the ammonium nitrate melt contains 100 to 200 ppm granulation aid/s.

11. The method according to claim 10, wherein the ammonium nitrate melt contains 150 ppm granulation aid/s.

12. The method according to claim 8, wherein the granulation aid/s is a salt of a straight chain sulfonate.

13. The method according to claim 12, wherein the granulation aid/s is the sodium salt of a salt of a straight chain sulfonate.

* * * * *